US007852197B2

(12) United States Patent
Dinh et al.

(10) Patent No.: US 7,852,197 B2
(45) Date of Patent: Dec. 14, 2010

(54) SYSTEM AND METHOD FOR INHIBITING DETECTION OF DEACTIVATED LABELS USING DETECTION FILTERS HAVING AN ADAPTIVE THRESHOLD

(75) Inventors: Erik Lee Dinh, Boca Raton, FL (US); Manuel A. Soto, Lake Worth, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 409 days.

(21) Appl. No.: 11/931,176

(22) Filed: Oct. 31, 2007

(65) Prior Publication Data

US 2008/0303671 A1 Dec. 11, 2008

Related U.S. Application Data

(60) Provisional application No. 60/933,708, filed on Jun. 8, 2007.

(51) Int. Cl.
*H04Q 5/22* (2006.01)

(52) U.S. Cl. .................... 340/10.3; 340/10.1; 340/10.41

(58) Field of Classification Search ................. 340/572, 340/551, 10.1, 10.2, 572.1
See application file for complete search history.

(56) References Cited

U.S. PATENT DOCUMENTS

| | | | | |
|---|---|---|---|---|
| 5,150,387 | A * | 9/1992 | Yoshikawa et al. | 375/240 |
| 5,469,142 | A | 11/1995 | Bergman et al. | |
| 5,602,531 | A * | 2/1997 | Rude et al. | 340/572.4 |
| 5,717,821 | A * | 2/1998 | Tsutsui et al. | 704/200.1 |
| 5,801,631 | A * | 9/1998 | Hayashi | 340/572.5 |
| 6,111,507 | A * | 8/2000 | Alicot et al. | 340/572.1 |
| 6,226,608 | B1 * | 5/2001 | Fielder et al. | 704/229 |
| 6,288,640 | B1 * | 9/2001 | Gagnon | 340/539.17 |
| 6,333,692 | B1 * | 12/2001 | Andersen et al. | 340/572.1 |
| 6,353,645 | B1 * | 3/2002 | Solve et al. | 375/354 |
| 6,784,813 | B2 * | 8/2004 | Shanks et al. | 341/53 |
| 6,906,629 | B2 * | 6/2005 | Frederick | 340/572.1 |
| 6,930,618 | B2 * | 8/2005 | Touyama et al. | 341/51 |

(Continued)

FOREIGN PATENT DOCUMENTS

WO 2006086601 A2 8/2006

OTHER PUBLICATIONS

International Search Report and Written Opinion dated Feb. 9, 2009 for International Application Serial No. PCT/US2008/006480, International Filing Date May 20, 2008 consisting of 14-pages.

*Primary Examiner*—Daniel Wu
*Assistant Examiner*—Rufus Point
(74) *Attorney, Agent, or Firm*—Alan M. Weisberg; Christopher & Weisberg, P.A.

(57) ABSTRACT

A method, system and computer program product for inhibiting detection of deactivated tags. The method, system and computer program product include receiving a signal that includes environment noise from at least one tag, extracting signal detection information that includes a signal detection energy value from the received signal, extracting signal deactivation information that includes a signal deactivation energy value from the received signal, and determining a failure to deactivate ratio that corresponds to the signal detection energy value divided by the signal deactivation energy value. Generation of an alarm event is inhibited upon the failure to deactivate ratio being less than the selectable threshold and generating a noise factor to adjust a selectable threshold.

20 Claims, 3 Drawing Sheets

U.S. PATENT DOCUMENTS 7,049,933 B1 * 5/2006 Koerner .................... 340/10.1
7,057,511 B2 * 6/2006 Shanks et al. ............ 340/572.1
7,213,751 B2 * 5/2007 Backlund et al. ............ 235/383
7,239,229 B2 * 7/2007 Bauhahn .................. 340/10.42
7,253,734 B2 * 8/2007 Moskowitz ............. 340/572.3
7,573,381 B2 * 8/2009 Karr ...................... 340/539.13
7,619,528 B2 * 11/2009 Kobres .................... 340/572.3
2003/0053522 A1 * 3/2003 Hayoun et al. .............. 375/147
2006/0175402 A1 8/2006 Maitin

* cited by examiner

SYSTEM AND METHOD FOR INHIBITING DETECTION OF DEACTIVATED LABELS USING DETECTION FILTERS HAVING AN ADAPTIVE THRESHOLD

CROSS-REFERENCE TO RELATED APPLICATION

This application is related to and claims priority to U.S. Provisional Application Ser. No. 60/933,708, filed Jun. 8, 2007, entitled Narrow Band QMF Output and Adaptive Threshold for Inhibiting Detection of Deactivated Labels, the entirety of which is incorporated herein by reference.

STATEMENT REGARDING FEDERALLY SPONSORED RESEARCH OR DEVELOPMENT n/a

FIELD OF THE INVENTION

The present invention generally relates to electronic security systems, and in particular, to electronic article surveillance ("EAS") detection filtering and a method for inhibiting detection of deactivated tags in a security system

BACKGROUND OF THE INVENTION

Electronic article surveillance ("EAS") systems are detection systems that allow the identification of a marker, tag or label within a given detection zone. EAS systems have many uses, but most often they are used as security systems for preventing shoplifting in stores or removal of property in office buildings. EAS systems come in many different forms and make use of a number of different technologies.

A typical EAS system includes an electronic detection unit, tags, labels and/or markers, and a detacher or deactivator. The detection units can, for example, be formed as pedestal units, buried under floors, mounted on walls, or hung from ceilings. The detection units are usually placed in high traffic areas, such as entrances and exits of stores or office buildings. The tags, labels and/or markers have special characteristics and are specifically designed to be affixed to or embedded in merchandise or other objects sought to be protected. When an active tag passes through a tag detection zone, the EAS system sounds an alarm, a light is activated and/or some other suitable alert devices are activated to indicate the removal of the tag from the prescribed area.

Common EAS systems operate with these same general principles using either transceivers, which each transmit and receive, or a separate transmitter and receiver. Typically the transmitter is placed on one side of the detection zone and the receiver is placed on the opposite side of the detection zone. The transmitter produces a predetermined excitation signal in a tag detection zone. In the case of a retail store, this detection zone is usually formed at an exit. When an EAS tag enters the detection zone, the tag has a characteristic response to the excitation signal, which can be detected. For example, the tag may respond to the signal sent by the transmitter by using a simple semiconductor junction, a tuned circuit composed of an inductor and capacitor, soft magnetic strips or wires, or vibrating magneto acoustic resonators. The receiver subsequently detects this characteristic response. By design, the characteristic response of the tag is distinctive and not likely to be created by natural circumstances.

An consideration in connection with the use of such EAS systems is to minimize the occurrence of false alarms which could either cause embarrassment to customers of an EAS system user, e.g., a retail store, or produce annoying and disruptive alarm signals when no one is passing through the store's EAS system or when a tag has not been properly deactivated.

Failure to deactivate ("FTD") is a major complaint affecting all EAS detection platforms. This undesirable side effect poses a serious confidence issue to system users, who inadvertently grow accustomed to "deactivated" tags triggering an alarm, thus, ignoring valid alarm events where live tags are involved. This phenomenon occurs when a tag, or label, is not properly deactivated and still carries some properties of a live tag, mainly a spectral (frequency) property. Theoretically, the natural frequency (characteristic frequency) of a live tag is approximately 58 kHz. Consequently, many detection platforms are designed to have approximate operating frequencies of 57.8 kHz to 58.2 kHz. When a tag is properly deactivated, its characteristic frequency is typically shifted to the 60 kHz range, to effectively place the tag outside of the desired frequency detection range, and thus the tag can no longer trigger an alarm event. A partially deactivated or "wounded" tag, however, can have its characteristic frequency shifted to the 59 kHz range and can potentially be detected, especially if the tag's energy is large enough at its new spectral (frequency) attribute. Statistically, about 10%-15% of tags being deactivated are really only wounded tags that are not thoroughly neutralized, and therefore result in relatively high occurrence of FTD events for system users.

Attempts to resolve the FTD issue have included digital frequency estimators using a Tabei and Musicus technique, which is a very complex algorithm that produces nonlinear output responses. Frequency estimators suffer from a phenomenon referred to as "threshold effect". Threshold effect occurs when a frequency estimator performs satisfactorily above some minimum input signal-to-noise ratio ("SNR"), but degrades very rapidly below that minimum SNR. This problem is amplified by the fact that the frequency estimator must operate on the raw input signal, and a low minimum SNR will bring about inconsistent zero crossing points. These zero crossing points are the basis for the Tabei and Musicus technique and eventually lead to undependable frequency estimations. Therefore, a FTD criterion based on a frequency estimator is unreliable and leads to a high rate of false alarms caused by tags that have not been properly deactivated.

What is needed is a method and system that can be used to inhibit detection of deactivated tags in a detection system.

SUMMARY OF THE INVENTION

The present invention advantageously provides a method, system and computer program product for inhibiting detection of deactivated electronic article surveillance tags in a security system. In one embodiment, a method for inhibiting detection of deactivated tags in a security system can include receiving a signal that includes environment noise from at least one tag, extracting signal detection information that includes a signal detection energy value from the received signal, extracting signal deactivation information that includes a signal deactivation energy value from the received signal, determining a failure to deactivate ratio that corresponds to the signal detection energy value divided by the signal deactivation energy value, and inhibiting generation of an alarm event conditioned upon the failure to deactivate ratio being less than the selectable threshold.

In accordance with another aspect, a system for inhibiting detection of deactivated tags in a security system is provided. The system includes a receiver that receives a signal that includes environment noise from at least one tag, a detection frequency filter that extracts signal detection information that includes a signal detection energy value from the received signal, and a deactivation frequency filter that extracts signal deactivation information that includes a signal deactivation energy value from the received signal. The system can also include a processor that operates to determine a failure to deactivate ratio that corresponds to the signal detection energy value divided by the signal deactivation energy value and inhibit the generation of an alarm event conditioned upon the failure to deactivate ratio being less than a selectable threshold.

In accordance with another aspect, the present invention provides a computer program product including a computer usable medium having a computer readable program for a security system which when executed on a computer causes the computer to perform a method. The method includes receiving a signal that includes environment noise from at least one tag, extracting signal detection information that includes a signal detection energy value from the received signal, extracting signal deactivation information that includes a signal deactivation energy value from the received signal, determining a failure to deactivate ratio that corresponds to the signal detection energy value divided by the signal deactivation energy value and inhibiting generation of an alarm event conditioned upon the failure to deactivate ratio being less than the selectable threshold.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
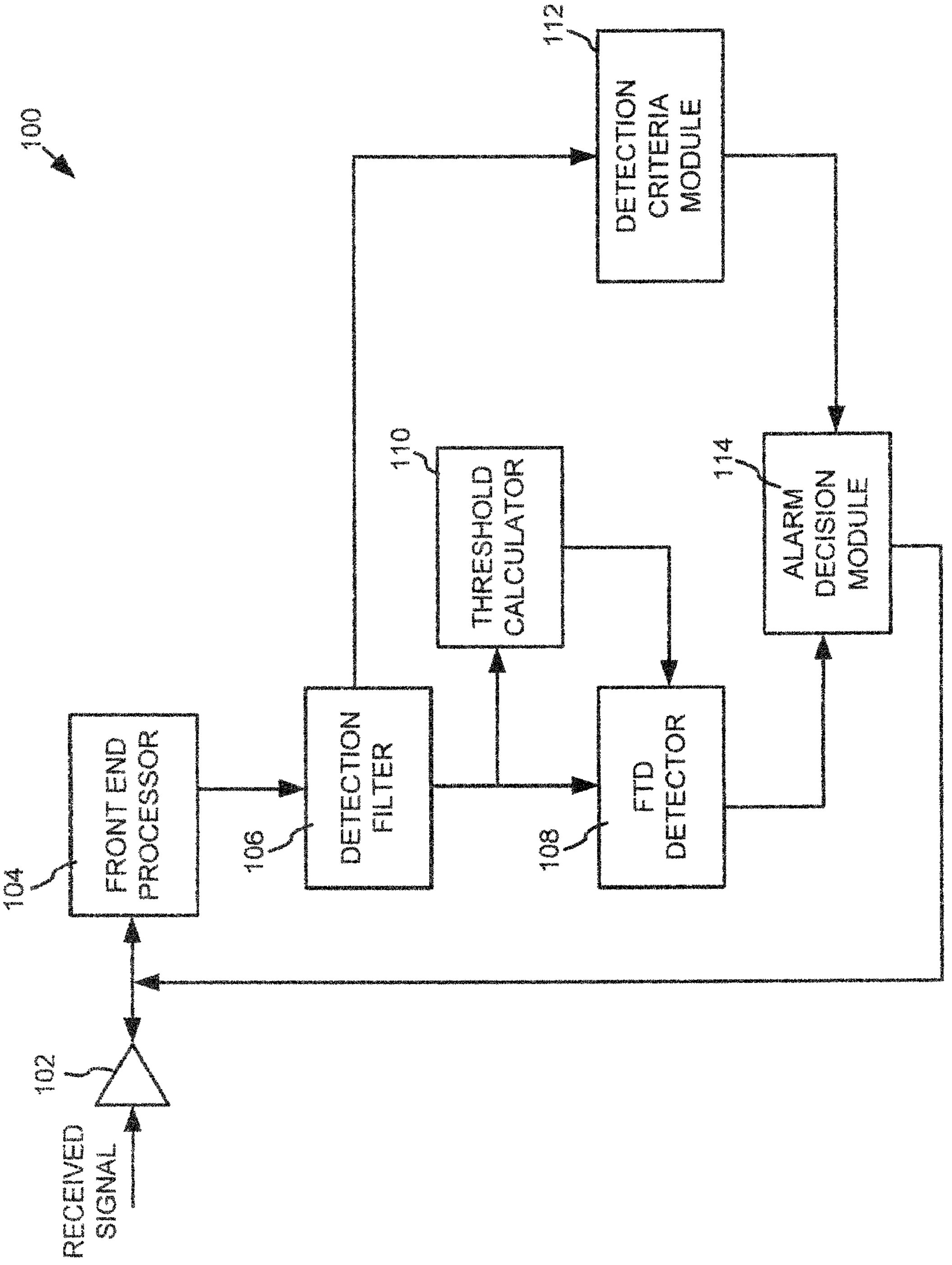
FIG. 1 is a block diagram of an electronic article surveillance detection system constructed in accordance with the principles of the present invention.

Referring now to the drawing figures in which like reference designators refer to like elements, there is shown in FIG. 1 a diagram of an exemplary system constructed in accordance with the principles of the present invention and designated generally as “100”. Electronic article surveillance (“EAS”) detection system 100 includes transceiver unit 102 configured to receive communication signals from an electronic tag, front-end processor 104 in communication with transceiver unit 102 to process the received electronic tag signals, detection frequency filter 106 and failure-to-deactivate (“FTD”) detector 108 in communication with front-end processor 104 for receiving samples of the received electronic tag signal from front-end processor 104. Detection system 100 can further include a threshold calculator 110, a detection criteria module 112 and an alarm decision module 114.

Transceiver unit 102 includes one or more antennas transmitting and receiving communication signals, in combination with related transmit and receive circuitry. Transceiver unit 102 receives communication signals from an electronic tag and provides these received signals to front-end processor 104. Front-end processor 104 can include, for example, a demodulator in communication with one or more bandpass filters and analog to digital converters, a digital signal processor and various types of memory storage. Front-end processor 104 receives communication signals from transceiver unit 102 and processes the received communication signals to provide samples of the received communication signals to the detection frequency filter 106 and FTD detector 108.

Detection frequency filter 106 includes one or more detection quadrature matched filters (“QMF”) to extract signal information at a specific frequency or frequencies in a detection frequency range, e.g., 57,800 Hz to 58,200 Hz. FTD detector 108 includes one or more FTD QMF filters, e.g., 202, 204 and 206 (as shown in FIG. 2) that extracts signal information at a specific frequency in a FTD frequency range, e.g., 59,000 Hz to 59,300 Hz.

Threshold calculator 110 provides for the establishment of a preset or selectable threshold value and the modification of that preset or selectable threshold value, which the threshold calculator 110 supplies to FTD detector 108 and alarm decision module 114. Threshold calculator 110 can include QMF filters, summers, dividers, etc. Detection criteria module 112 can detect signal information, e.g., amplitude, energy level and phase of the received signal that has passed through the detection frequency filter 106 and the FTD detector 108. Alarm decision module 114 receives the signal information from detection criteria module 112 and processes the signal information to determine whether to generate or inhibit an alarm.

The temporal aspect of the present invention is discussed with reference to a single time slot during which signals and noise are measured. In operation, an interrogation signal is transmitted during a transmit window (“Tx”). Once the interrogation signal is transmitted, a tag window is provided during which time a response from the interrogated tag is expected and measured. A synchronization period to allow the signal environment to stabilize is provided after the tag window. The remaining portion of the time slot is the noise window during which time the communication environment is expected to be devoid of interrogation and response signals such that the noise component of the communication environment can be measured.

Figure 2:
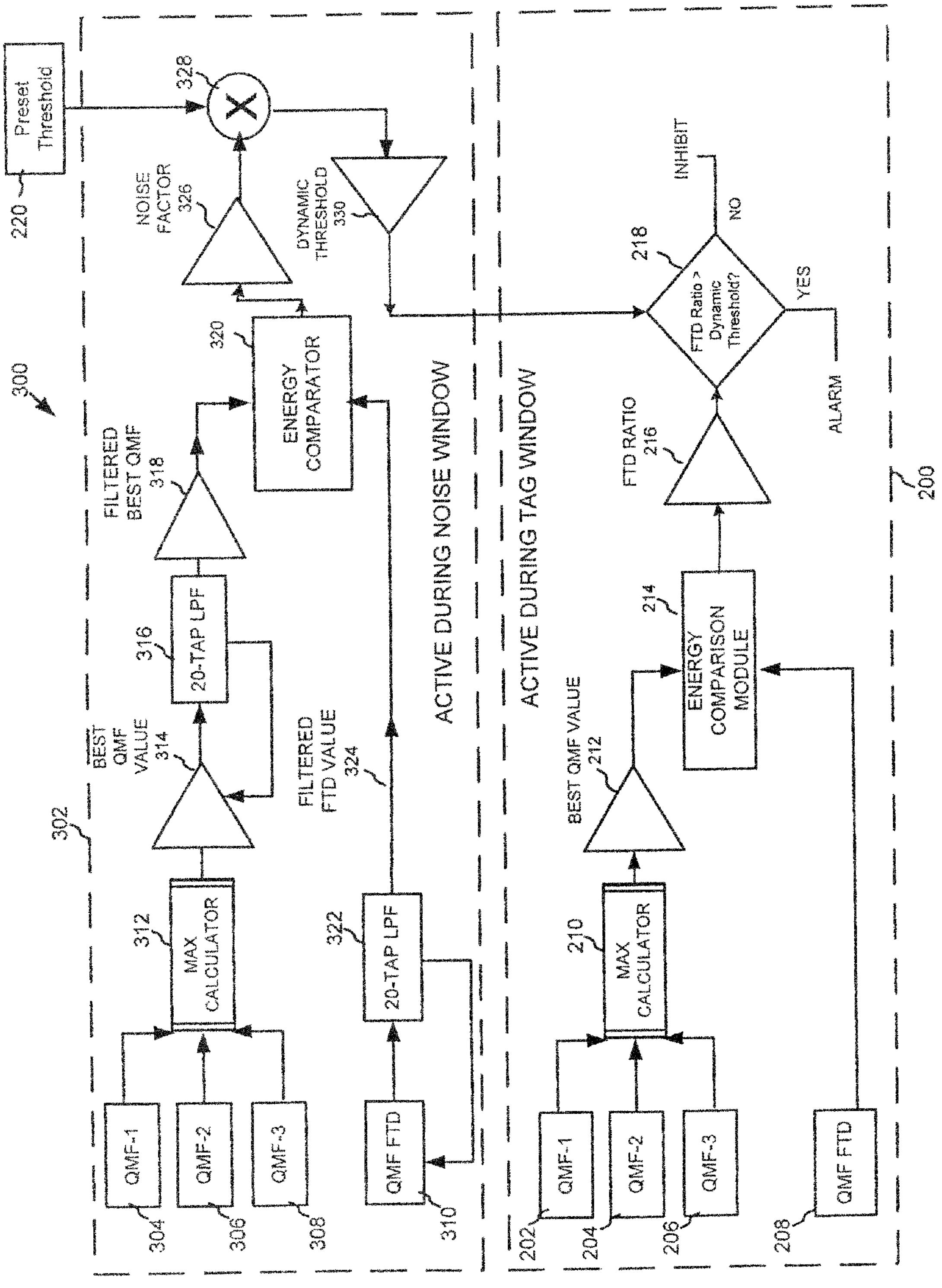
FIG. 2 is a block diagram of a detection filtering and deactivation filtering embodiment of the electronic article surveillance detection system of FIG. 1 having a noise tracker and constructed in accordance with the principles of the present invention.

FIG. 2 is a block diagram of an embodiment 300 of the detection filtering and deactivation filtering of the electronic article surveillance detection system 100 of FIG. 1. System 300 includes a tag detection system 200, active during the tag window and a noise tracking system 302 active during the noise window. Thus, noise tracking system 302 and tag detection system 200 obtain data from different sources (exterior environmental noise and tag information respectively), and do so at different times.

Tag detection system 200 includes detection QMF filters 202, 204 and 206, e.g., QMF-1, QMF-2 and QMF-3, which receive the sampled signal from front-end processor 104 and extract signal information at a specific frequency or frequencies in a detection frequency range, e.g., substantially 57,800

Hz, 58,000 Hz and 58,200 Hz. Another QMF filter 208, e.g., QMF FTD, receives the received signal from front-end processor 104 and extracts signal information at a deactivation frequency, e.g., substantially 59,300 Hz. MAX calculator 210 receives the outputs of detection QMF filters 202, 204 and 206. MAX calculator 210 determines the best QMF value 212 by comparing the signal detection energy values of the three signal detection outputs of QMF filters 202, 204 and 206. MAX calculator 210 passes the best QMF value 212 to an energy comparison module 214. Energy comparison module 214 divides the best QMF value 212 by the energy value of QMF FTD 208 to determine an FTD ratio 216.

An FTD ratio comparator 218 receives the FTD ratio 216 and compares it to a selectable preset threshold 220, after it has been adjusted by a noise factor 326 (discussed below). If the FTD ratio 216 is greater than the selectable preset threshold 220, an alarm event is generated. If the FTD ratio 216 is less than the selectable preset threshold 220, the tag is determined to be a deactivated tag and the alarm event is inhibited. Although the tag window embodiment 200 illustrated in FIG. 2 includes three detection QMF filters 202, 204 and 206, it is contemplated that more or fewer detection QMF filters can be used in other embodiments.

Included in system 300 is noise tracking system 302. Although detection system 300 need not employ noise tracking system 302, and can determine whether to inhibit or deploy an alarm by comparing the FTD ratio to a preset threshold value as described above solely through the use of the tag detection system active during the tag detection window 200, noise tracking system 302 functions to compensate for excess noise in the environment of deployed detection system 300 by dynamically adjusting the selectable preset threshold 220. In noise tracking system 302, a noise factor 326 is generated and is injected directly into selectable preset threshold 220 via a multiplier 328 to provide a dynamic threshold 330 that is responsive to permanent or quasi-permanent noise sources in the deployment environment. Noise tracking system 302 includes noise detection QMF filters 304, 306 and 308, e.g., QMF-1, QMF-2 and QMF-3, and QMF FTD filter 310, e.g., QMF FTD. Noise tracker system 302 further includes a MAX calculator 312, which produces a detection frequency filter output such as a best QMF value 314, a low pass filter ("LPF") 316, e.g., 20-tap LPF, producing a filtered best QMF value 318, energy comparator 320, LPF 322, e.g., 20-tap LPF, which results in a filtered FTD value 324, noise factor 326 and multiplier 328.

MAX calculator 312 passes the best QMF value 314 to 20-tap LPF 316 for filtering. 20-tap LPF 316 filter delays the received detection signal, e.g., the received tag signal, such that an instantaneous spike does not immediately change or influence the noise factor 326. Similarly, 20-tap LPF 322 delays the received deactivation signal, e.g., the received tag signal, such that an instantaneous spike does not immediately change or influence the noise factor 326. Instead, only a permanent or quasi-permanent noise source can gradually affect the noise factor 326, which in turn adjusts the selectable preset threshold 220.

The inputting of the filtered QMF value 318 and the filtered FTD value 324 to energy comparator 320 advantageously allows the selectable preset threshold 220 to be dynamically adjusted such that the FTD criterion does not unfairly prevent legitimate tag alarms when there is high noise at the deactivation frequency band, e.g., at 59,300 Hz. In this embodiment, a 20-tap LPF is selected to provide a noise factor 326 that is a weighted average of the noise and received signal over twenty frames of data. It is contemplated that lowpass filters having more or less taps may be used in detection system 300.

Energy comparator block 320 divides the filtered best QMF value 318 by the filtered QMF FTD value 324 to determine the noise factor 326. Multiplier 328 multiplies the selectable preset threshold 220 by the noise factor 326 to generate a dynamic threshold 330. FTD ratio comparator 218 receives FTD ratio 216 and compares it to the dynamic threshold 330. If the FTD ratio 216 is greater than the dynamic threshold 330, then an alarm is generated. If the FTD ratio 216 is less than the dynamic threshold 330, the tag is a deactivated tag and the alarm is inhibited. Although the embodiment illustrated in FIG. 2 includes three detection QMF filters 304, 306 and 308, it is contemplated that more or less detection QMF filters can be used in other embodiments. In addition, although separate elements, such as separate QMF filters, comparators and maximum value calculators are shown in tag detection system 200 and noise detection system 302, it is understood that such depiction is merely to aid understanding of the present invention and that these elements can be the same physical element used by the different systems (tag detection system 200 and noise detection system 302) at different times. Such is the case because tag detection system 200 and noise detection system 302 are active during different time periods within the measurement time slot, thereby allowing component re-use.

Figure 3:
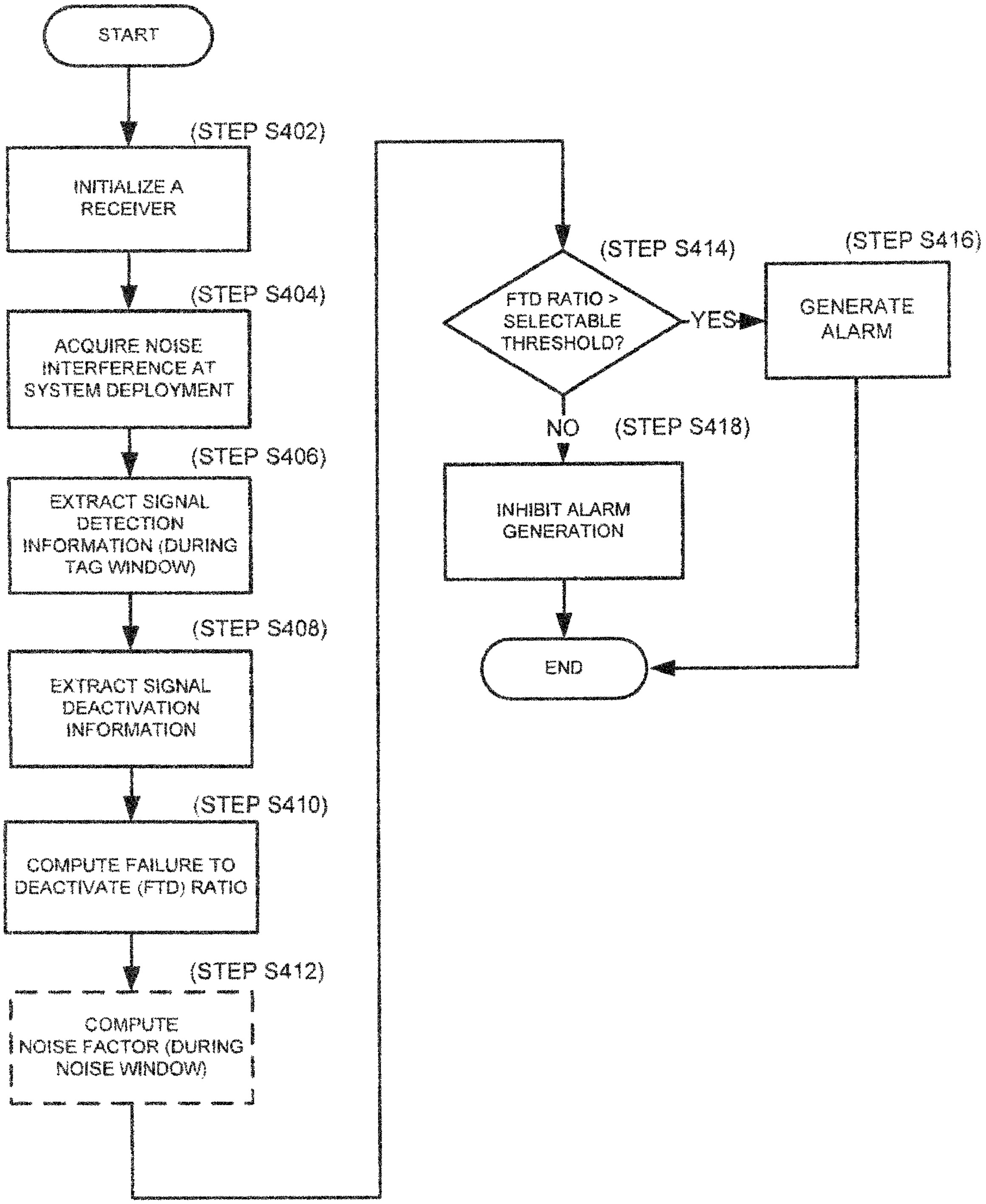
FIG. 3 is a flowchart of an exemplary process for inhibiting detection of deactivated labels in accordance with the principles of the present invention.

FIG. 3 is an exemplary process for inhibiting detection of deactivated labels in accordance with the principles of the present invention. Transceiver 102 is initialized (step S402) and noise interference at the deployment site of detection system 100, 200 or 300 is initially obtained (step S404). This information can be used to establish the preset threshold or the initial starting point for the dynamic threshold. Initial measurements can be taken by sampling the environment over a plurality of frames using, for example, noise detection system 302 to provide a weighted average of the noise a plurality of time slots. During the tag window, signal detection information, e.g., detection amplitude, detection energy level and detection frequency phase, is extracted from a received signal using detection filters 202, 204 and 206 (step S406). Signal deactivation information, e.g., deactivation amplitude, deactivation energy level and deactivation frequency phase, is extracted from a received signal using QMF FTD filters 208 and/or 310 (step S408). A failure-to-deactivate ratio 216 is determined by dividing the best QMF value 212 by the energy value of QMF FTD filter 208 (step S410).

As an optional step, noise factor 326 is computed based on noise data obtained during the noise window (step S412). For example, one or more 20-tap lowpass filters 316, 322 are selected to provide a weighted average of the noise and received signal over a plurality of time slots, e.g., twenty time slots. In this embodiment, energy comparison block 320 computes or generates noise factor 326 by dividing a filtered best QMF 318 energy value by a filtered QMF FTD 324 energy value and designates that output as the best QMF 314. The best QMF 314 passes to a 20-tap LPF 316, which filters the best QMF 314 to smooth out signal and noise spikes. The 20-tap LPF 316 can also delay the received detection signal, e.g., the received tag signal, to provide a weighted average such that an instantaneous spike does not immediately change or influence the noise factor 326. Similarly, 20-tap LPF 322 processes the output of deactivation QMF FTD 310 to provide the filtered QMF FTD 324 to energy comparison block 320. Noise factor 326 can be combined with the selectable preset threshold 220 to generate dynamic threshold 330.

FTD ratio comparator 332 compares FTD ratio 216 to dynamic threshold 330 (step S414). If the value of FTD ratio 216 exceeds the value of dynamic threshold 330, an alarm is generated (step S416). In other words, when the ratio of detection QMF filter energy level over deactivation QMF FTD filter energy level is greater than the value of dynamic threshold 330, the tag should be an active tag and the system should generate an alarm event. Otherwise, the energy at the deactivation frequency, e.g., 59,300 Hz, should be greater than the energy at the detection frequency, e.g., 58,000 Hz, which indicates that the tag is a "wounded" tag, and alarm events should be inhibited (step S418).

The present invention advantageously provides a system for inhibiting alarm events caused by deactivated EAS tags or labels using energy level detection. The system further provides an adaptive threshold dynamic noise-tracker to reduce the effects of environmental noise.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the invention.

What is claimed is:

1. A method for inhibiting detection of deactivated electronic article surveillance tags, the method comprising:

receiving a signal from at least one tag, the signal including signal detection information and signal deactivation information;

extracting the signal detection information from the received signal, the received signal detection information including a signal detection energy value;

extracting the signal deactivation information from the received signal, the received signal deactivation information including a signal deactivation energy value;

determining a failure to deactivate ratio, the failure to deactivate ratio corresponding to the signal detection energy value divided by the signal deactivation energy value; and inhibiting generation of an alarm event conditioned upon the failure to deactivate ratio being less than a selectable threshold.

2. The method of claim 1, further comprising selecting the signal detection energy value having the highest energy value from the output of one or more detection frequency filters.

3. The method of claim 1, wherein extracting signal deactivation information includes filtering the received signal using a plurality of filters during a tag window portion of a time slot.

4. The method of claim 3, wherein the plurality of filters are quadrature matched filters.

5. The method of claim 1, wherein the selectable threshold is dynamically adjustable.

6. The method of claim 5, further comprising sampling a plurality of received signal data frames to establish a noise factor, the noise factor being used to adjust the dynamically adjustable selectable threshold.

7. The method of claim 6, wherein establishing the noise factor includes:

averaging a highest detection signal amplitude over the plurality of received signal time slots to generate a weighted average; and filtering the weighted average using a low pass filter.

8. The method of claim 7, wherein noise establishing the noise factor is measured during a time slot window.

9. The method of claim 6, further comprising determining the dynamically adjustable selectable threshold by multiplying the selectable preset threshold by the noise factor.

10. A system for inhibiting detection of deactivated tags, the system comprising:

a receiver, the receiver receiving a signal from at least one tag, the received signal including signal detection information and signal deactivation information;

a detection frequency filter, the detection frequency filter extracting the signal detection information from the received signal, the received signal detection information including a signal detection energy value;

a deactivation frequency filter, the deactivation frequency filter extracting signal deactivation information from the received signal, the received signal deactivation information including a signal deactivation energy value; and a processor, the processor operating to:

determine a failure to deactivate ratio, the failure to deactivate ratio corresponding to the signal detection energy value divided by the signal deactivation energy value; and inhibit generation of an alarm event conditioned upon the failure to deactivate ratio being less than a selectable threshold.

11. The system of claim 10, wherein the processor further operates to select the signal detection energy value having the highest energy value from one or more detection frequency filters.

12. The system of claim 10, wherein the detection frequency filter and the deactivation frequency filter are comprised of one or more quadrature matched filters.

13. The system of claim 10, wherein the selectable threshold is dynamically adjustable.

14. The system of claim 13, wherein the processor further operates to sample a plurality of received signal data frames to establish a noise factor, the noise factor being used to adjust the dynamically adjustable selectable threshold.

15. The system of claim 14, wherein the processor further operates to establish the noise factor by:

averaging the best detection signal amplitude over the plurality of received signal data frames to generate a weighted average; and filtering the weighted average using a low pass filter.

16. The system of claim 14, wherein the processor further operates to determine the dynamically adjustable selectable threshold by multiplying the selectable preset threshold by the noise factor.

17. The system of claim 10, wherein the detection frequency filter extracts signal detection information at one of a specific frequency and frequency range, and wherein the deactivation frequency filter extracts deactivation signal information at a predetermined frequency.

18. The system of claim 17, wherein the predetermined deactivation frequency is substantially 59,300 Hz.

19. A computer program product comprising a non-transitory computer usable medium having a computer readable program for a security system which when executed on a computer causes the computer to perform a method comprising:

receiving a signal from at least one tag, the signal including signal detection information and signal deactivation information; extracting the signal detection information from the received signal, the received signal information including a signal detection energy value; extracting signal deactivation information from the received signal, the received deactivation signal information including a signal deactivation energy value; determining a failure to deactivate ratio, the failure to deactivate ratio corresponding to the signal detection energy value divided by the signal deactivation energy value; and inhibiting generation of an alarm event conditioned upon the failure to deactivate ratio being less than a selectable threshold.

20. The method of claim 19 further comprising further comprising selecting the signal detection energy value having the highest energy value from the output of one or more detection frequency filters, wherein the selectable threshold is dynamically adjustable, the dynamic adjustment being based on a noise factor.

* * * * *